United States Patent [19]

Carlson

[11] Patent Number: 5,271,547
[45] Date of Patent: Dec. 21, 1993

[54] METHOD FOR BRAZING TUNGSTEN CARBIDE PARTICLES AND DIAMOND CRYSTALS TO A SUBSTRATE AND PRODUCTS MADE THEREFROM

[75] Inventor: Steven K. Carlson, Gainesville, Ga.

[73] Assignee: Tunco Manufacturing, Inc., Flowery Branch, Ga.

[21] Appl. No.: 945,235

[22] Filed: Sep. 15, 1992

[51] Int. Cl.5 .............. B23K 1/00; B24D 3/08
[52] U.S. Cl. ................. 228/122.1; 51/295; 51/309
[58] Field of Search ........... 228/121, 122, 248; 51/295, 309

[56] References Cited

U.S. PATENT DOCUMENTS

| | | | |
|---|---|---|---|
| 3,378,361 | 4/1968 | Harris, Jr. | 51/309 |
| 3,751,283 | 8/1973 | Dawson | 51/309 X |
| 3,854,898 | 12/1974 | Whitney | 51/295 |
| 4,018,576 | 4/1977 | Lowder et al. | 51/309 R |
| 4,039,700 | 8/1977 | Sohmer et al. | 427/46 |
| 4,749,594 | 6/1988 | Malikowski et al. | 427/190 |
| 4,776,862 | 10/1988 | Wiand | 51/295 X |
| 4,931,069 | 6/1990 | Wiand | 51/309 X |

*Primary Examiner*—Kenneth J. Ramsey
*Attorney, Agent, or Firm*—Deveau, Colton & Marquis

[57] ABSTRACT

An improved abrasive tool and method for producing the same by brazing diamond crystals and tungsten carbide particles to a metal substrate using a combination of a copper-based alloy brazing material and a nickel-based alloy brazing material.

20 Claims, 2 Drawing Sheets

METHOD FOR BRAZING TUNGSTEN CARBIDE PARTICLES AND DIAMOND CRYSTALS TO A SUBSTRATE AND PRODUCTS MADE THEREFROM

BACKGROUND OF THE INVENTION

1. Field of the Invention

This invention generally relates to a method for brazing tungsten carbide particles and diamond crystals in one operation, and more specifically relates to a method for brazing tungsten carbide particles and diamond crystal in one operation to a metal substrate to produce an improved abrasive tool.

2. Prior Art

Abrasive tools typically comprise a hard abrasive particle, such as diamond crystals or tungsten carbide particles, adhered to a substrate, such as a metal substrate. For example, abrasive tools comprising tungsten carbide particles brazed to a metal substrate and abrasive tools comprising diamond crystals brazed to a metal substrate are known in the art. Thus, prior techniques predominantly have involved either independently brazing tungsten carbide particles to a substrate or independently brazing diamond crystals to a substrate. Due to production and material costs of diamond tooling, tungsten carbide has been commonly used as an economical replacement when cutting or grinding requirements would allow.

Prior art methods of brazing diamond crystals to metal substrates have required the use of vacuum or reducing atmosphere furnaces operating at 1300° C. or less. The primary brazing alloy for brazing diamond crystals to metal substrates comprises a cobalt or nickel base and contains a certain percentage of chromium.

Prior art methods of brazing tungsten carbide to metal substrates utilize similar procedures and equipment to the methods for brazing diamond crystals to metal substrates. However, there is a wider range of braze alloys which are suitable for wetting to the tungsten carbide particles than there are for wetting to the diamond crystals. These braze alloys include the cobalt, nickel, and copper based alloy families. Prior attempts at utilizing copper as a braze alloy in diamond brazing has had limited success due to the lack of the ability of the copper to wet to the diamond crystal. This would produce little or no adhesion of the particle to the substrate.

U.S. Pat. No. 4,018,576 to Lowder et al. discloses a diamond abrasive tool and method of manufacture. The Lowder patent teaches a direct brazing technique of diamond crystals to a substrate surface using a brazing alloy of the cobalt and/or nickel base type which contains certain percentages of chromium. The Lowder method is characterized in that it teaches that by using a specific composition for the brazing alloy, no pre-conditioning of the diamond surface is necessary to obtain the wetting of the diamond surface by the brazing alloy. The brazing alloy used in the Lowder method comprises from 60 percent to 90 percent nickel or cobalt or mixtures thereof, up to 12 percent boron, silicon and/or phophorous, and 2 percent to 30 percent chromium.

U.S. Pat. No. 4,039,700 to Sohmer et al. discloses a hard metal coating process for metal objects. In the Sohmer patent, hard metal granules containing tungsten carbide are deposited onto a steel saw blade with a binder material comprising nickel alloys, cobalt alloys or low-melting iron alloys with boron and/or silicon. The steel blade then is heated in a protective gas atmosphere using a high-frequency electric current which provides an induction loop to cause the brazing. The preferred binder material comprises 84 percent nickel, 10 percent cobalt and no copper or chromium.

U.S. Pat. No. 4,749,594 to Malikowski et al. discloses a method for coating surfaces with hard substances. The Malikowski process utilizes a silver-based brazing alloy comprising 60 percent to 90 percent silver, 2 percent to 35 percent copper, 2 percent to 30 percent tin and/or indium, and 2 percent to 20 percent of certain other metals. Silver-based brazing alloys typically are less economical than copper-based and/or nickel-based alloys. Further, silver-based brazing alloys do not have the range of applicability as do copper-based alloys and nickel-based alloys.

Diamond crystals have exceptional durability and long lasting characteristics when used in the abrasive setting. Tungsten carbide particles have the ability to develop extremely sharp cutting edges and make exceptional abrasive tools. Typically, while the methods for brazing diamond crystals and tungsten carbide particles independently to substrates are similar, the brazing alloys most suitable for each are not the same. Therefore, it can be seen that there is a need for a method for brazing combinations of diamond crystals and tungsten carbide particles to metal substrates utilizing a single, economical brazing alloy.

BRIEF SUMMARY OF THE INVENTION

The present invention relates to an abrasive tool utilizing two abrasives interfaced together in one application process, and a process for producing such an abrasive tool. This process consists of a newly developed procedure for brazing which employs the combination of a nickel-based alloy and copper-based alloy to braze a combination of tungsten carbide particles and diamond crystals to a metal substrate, giving the ability to take advantage of both abrasives superior qualities in one abrasive tool. This invention combines the advantage of the diamond crystals' durability and long lasting characteristics with the advantage of the tungsten carbide's ability to develop extremely sharp cutting edges, producing an abrasive tool that gives extremely fast cutting abilities along with exceptional tool life.

A combination of a nickel-based alloy and a copper-based alloy is used as the brazing medium for brazing a combination of diamond crystals and tungsten carbide particles to a metal substrate. The brazing medium has an overall composition of from 40 percent to 50 percent copper-based alloy and from 50 percent to 60 percent nickel-based alloy, with the copper-based alloy comprising 50 percent to 60 percent cuprous oxide, 20 percent to 30 percent copper, and 11 percent to 17 percent ethylene glycol, and the nickel-based alloy comprising 60 percent to 80 percent nickel, 7 percent to 20 percent chromium, and the balance comprising boron, silicon, and iron not to exceed 8 percent each.

To produce the abrasive tool, the copper-based alloy, in the form of a paste, is applied to the surface of the metal substrate. The abrasive particles then are applied over the copper-based alloy paste in a predetermined density depending upon the product use. The nickel-based alloy, in the form of a powder, then is applied over the abrasive particles and copper-based alloy. The coated tool then is preheated at approximately 500° F. and then brazed in an atmosphere controlled furnace at approximately 2150° F. The preferred atmosphere within the furnace consists essentially of 70 percent nitrogen gas and 30 percent hydrogen gas with less than 0.05 percent oxygen. After brazing, the tool is cooled in a water cooled chamber in a controlled atmosphere using a nitrogen flush.

Therefore, it is the primary object of the present invention to produce an economical abrasive tool providing the versatility associated with brazing tungsten carbide particles while at the same time achieving the proven ability of diamond crystals.

It is another object of the present invention to provide an improved method for brazing abrasive particles onto a metal substrate.

A further object of the present invention is to produce an abrasive tool which utilizes a combination of diamond crystals and tungsten carbide particles as the abrading medium.

Yet another object of the present invention is to provide a method for brazing combinations of diamond crystals and tungsten carbide particles to a metal substrate.

A further object of the present invention is to provide a brazing material comprising copper-based alloys and nickel-based alloys which is suitable for brazing a combination of diamond crystals and tungsten carbide particles to a metal substrate.

A further object of the present invention is to produce an abrasive tool which has long lasting characteristics, extremely sharp cutting edges, resulting in an abrasive tool that has extremely good cutting abilities combined with exceptional tool life.

Another object of the present invention is to produce an abrasive tool which is economical, durable, and simple to manufacture, and a method for producing an abrasive tool which is economical, and simple and efficient in procedure.

Further objects and advantages of the present invention will be apparent from the following description with reference to the accompanying drawings in which preferred embodiments of the invention are shown.

DETAILED DESCRIPTION OF A PREFERRED EMBODIMENT

Figure 1:
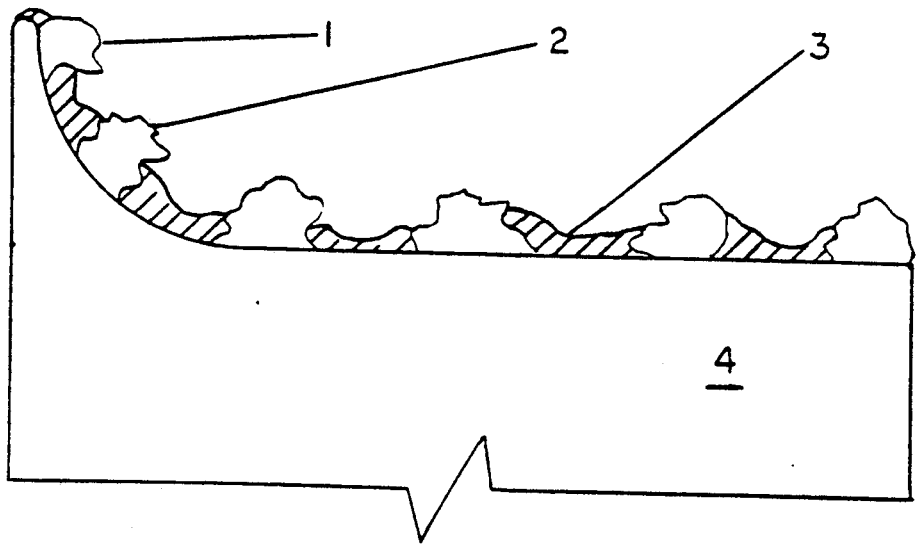
FIG. 1 is a cross-section of a wide wheel abrasive tool made by the process of the present invention.

With reference now to FIGS. 1-4, preferred embodiments of the abrasive tools of the present invention made by the process of the present invention are shown. Like reference numerals used in FIGS. 1-4 represent corresponding parts throughout the several views. The basic abrasive tool of the present invention comprises diamond crystals 1 and tungsten carbide particles 2 brazed to a metal substrate 4 by way of a copper/nickel-chrome alloy brazing material 3.

The present invention is a brazed abrasive cutting or grinding tool utilizing individual particles of tungsten carbide 2 and diamond crystals 1 applied jointly to one substrate 4. A new method has been developed utilizing the combination of nickel-based alloys and copper-based alloys to form a braze material 3 capable of bonding both the diamond crystals 1 and the tungsten carbide particles 2 to a metal substrate 4. The copper-based alloy is used in a paste form and comprises 50 to 60 percent cuprous oxide, 20 to 30 percent copper and 11 to 17 percent ethylene glycol. The nickel-based alloy is used in a powder form and comprises 60 to 80 percent nickel, 7 to 20 percent chromium, and the balance being made up of boron, silicon, and iron not to exceed 8 percent each. The ratio of copper alloy to nickel alloy in the brazing material 3 must be maintained to stay within the range of 40 to 50 percent copper alloy to 50 to 60 percent nickel alloy in the brazing material 3. The copper alloy, nickel alloy and brazing material composition ranges are shown in Table I.

TABLE I

| Compositions (% by weight) | | | | | |
|---|---|---|---|---|---|
| Copper Alloy | | Nickel Alloy | | Brazing Material | |
| 50–60% | Cuprous Oxide | 60–80% | Nickel | 20–30 | Copper Oxide |
| 20–30% | Copper | 7–20% | Chromium | 10–15% | Copper |
| 11–17% | Ethylene Glycol | <8% | Boron | 3–10% | Chromium |
| | | <8% | Silicon | 30–40% | Nickel |
| | | <8% | Iron | <5% | Boron |
| | | | | <5% | Silicon |
| | | | | <5% | Nickel |

To produce the abrasive tools, also referred to as piece parts or parts, of the present invention, the metal substrate 4 first is coated with the copper-based alloy paste. The abrasive particles 1,2 then are applied to the copper-based alloy paste. The nickel-based alloy powder then is applied to the surface of the abrasive particles 1,2 and the copper-based alloy paste. The coated piece part is preheated and then brazed.

More specifically the method of brazing the abrasives particles 1,2 to the metal substrate 4 comprises the first step of applying the copper-based alloy paste to the metal substrate 4 by means of spraying or brushing to achieve the desired coating thickness. The coating thickness of the copper-based alloy paste is determined by the diamond particles 1 and tungsten carbide particle 2 sizes relative to how much protrusion is required of the abrasive particles 1,2 out of the braze matrix. For example, for smaller diamond and tungsten carbide particle sizes or for greater protrusion of the particles from the metal substrate, a smaller coating thickness of the copper-based alloy paste is required, while for larger particle sizes or for less protrusion of the particles from the metal substrate, a greater coating thickness of the copper-based alloy paste is required. The consistency of the copper paste may be varied by thinning with ethylene glycol, depending on particle sizes being applied to the surface.

After application of the copper-based alloy to the metal substrate 4, the abrasive particles 1,2 are applied in the required density dependent on product use. The size and quantity ratio of the abrasive particles 1,2 is selected depending on the type of abrasive tool being made and the use for which the abrasive tool is to be put. In general, it is preferable for the abrasive particles 1,2 to be of similar and consistent sizes. However, there can be situations in which it is preferable to have a range of abrasive particle 1,2 sizes. For example, different abrasive tools and different uses may require combinations of abrasive particles 1,2 such as: consistently sized diamond particles 1 combined with equivalently consistently sized tungsten carbide particles 2; consistently sized diamond particles 1 which are larger than or small than consistently sized tungsten carbide particles; a range of sizes of diamond particles 1 combined with consistently sized tungsten carbide particles 2; consistently sized diamond particles 1 combined with a range of sizes of tungsten carbide particles 2; and a range of sizes of diamond particles 1 combined with a range of sizes of tungsten carbide particles 2. Further, although it is preferable to have relatively equal quantities of diamond particles 1 and tungsten carbide particles 2, certain abrasive tools and uses may require a higher or lower ratio of diamond particles 1 to tungsten carbide particles 2.

The nickel-based alloy powder then is applied to the surface of the copper-based alloy and abrasive particles 1,2. It is preferred to use a nickel-based alloy powder which will fit through a 325 mesh (U.S.) sieve. While other mesh sizes of nickel-based alloy powder are suitable, a 325 mesh size allows for the more efficient brazing. The nickel-based alloy is held suspended in the copper-based alloy paste due to the liquidity consistency of the paste. Fluxing agents are not used or required in the present brazing procedure.

The piece part then is preheated in a non-atmosphere controlled furnace at approximately 500° F. to bake out any existing moisture. Obviously, the piece part may be preheated at any temperature above 212° F. to evaporate any moisture on the piece part, in the copper-based alloy or the nickel-based alloy, or on the abrasive particles 1,2. It is preferred to keep the preheating temperature below about 1000° F. to prevent premature melting and degradation of the various components. The preheat time and temperature are determined by part size and weight so as to assure that complete drying is accomplished.

The piece part then is brazed in an atmosphere controlled furnace maintained at a temperature of between approximately 2080° F. and 2200° F., and preferably approximately 2150° F. ±10° F. Purity of the atmosphere within the furnace is maintained using a mix of hydrogen and nitrogen gases at a ratio of approximately 70 percent nitrogen to 30 percent hydrogen. Oxygen levels during the braze cycle must be maintained below 0.05 percent or insufficient bonding of the abrasive particles 1,2 to the metal substrate 4 will occur. The abrasive tool is left in the furnace until the entire part has achieved the 2150° F. set point temperature. After set point temperature has been achieved, the piece part remains in the furnace for an additional 15 minute saturation time to allow all braze materials to alloy together. The furnace must be maintained at a temperature above the melting points of both the copper-based alloy and the nickel-based alloy for proper brazing of the abrasive particles 1,2 to the metal substrate 4 to occur.

At approximately 2000° F., both the nickel-based alloy and copper-based alloy are above their melting points, become molten and combine to produce a braze alloy 3 which consists of approximately 25 to 30 percent cuprous oxide, 10 to 15 percent copper, 3 to 10 percent chromium, 30 to 40 percent nickel, with the balance being boron, silicon, iron and any other compounds present prior to brazing.

After the braze cycle, the piece part is cooled, preferably using a water cooled chamber, to bring the piece part back to below approximately 120° F., and preferably approximately 70° F. The atmosphere must be maintained in the cooling chamber, typically utilizing a nitrogen flush.

The brazing process may be accomplished, and the same results may be obtained, by use of a continuous feed furnace that has the ability to maintain the same purity levels.

The above-described process can be used to make a variety of abrasive tools of different shapes and sizes and for different uses, comprising varying amounts and sizes of the respective abrasive particles 1,2. The following examples illustrate the above-described process as used in producing the illustrative abrasive tools shown in FIGS. 1-4.

EXAMPLE I

With respect to FIG. 1, a copper-based alloy paste comprising 60 percent cuprous oxide, 30 percent copper and 10 percent ethylene glycol is applied by brush to a 7" diameter by 2⅜" wide wheel machined from 1018 HRS. Tungsten carbide particles sized at 0.008" maximum and 0.006" minimum are applied to the outside diameter of the wheel at 25 percent coverage. Immediately after, diamond particles of 60/80 mesh are applied to the copper-based alloy paste to achieve a total density of 50 percent coverage. Nickel alloy powder consisting of 14.6 percent chromium, 2.9 percent boron and 4.7 percent silicon and the remainder being nickel is applied to the outside diameter of the wheel where it adheres to the copper alloy paste. The part then is dryed at 500° F. for 30 minutes until all moisture is removed from the part. The piece part then is placed into a 2150° F. atmosphere controlled furnace and allowed to come up to the set-point temperature (2150° F.). A saturation time of 15 minutes is given to the part to achieve the set-point temperature to allow the braze materials to alloy together. The piece part then is cooled in a nitrogen flushed cool zone and allowed to cool to 70° F. The abrasive particles are brazed to the metal substrate with excess of 50 percent of each individual abrasive particle protruding out of the braze alloy.

EXAMPLE II

Figure 2:
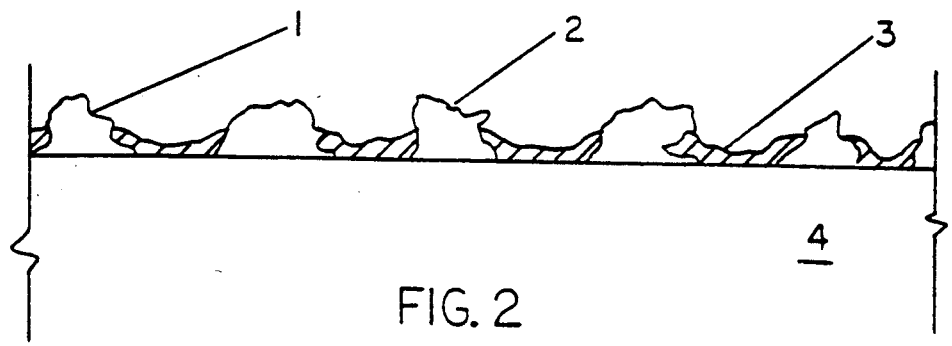
FIG. 2 is a cross-section of a strip abrasive tool made by the process of the present invention.

With respect to FIG. 2, a strip of 1018 mild steel ½" wide by 0.125" thick by 8" long is coated in the same procedure as Example 1. The reduced weight of this part allowed this item to have the braze cycle performed in a continuous feed atmosphere controlled furnace. All temperature and gas ratios were maintained as in Example 1. The feed rate was set at 1.6 inches per minute to achieve a 15 minute time cycle in a 24" heat zone. Braze results were the same as accomplished in Example 1.

EXAMPLE III

Figure 3:
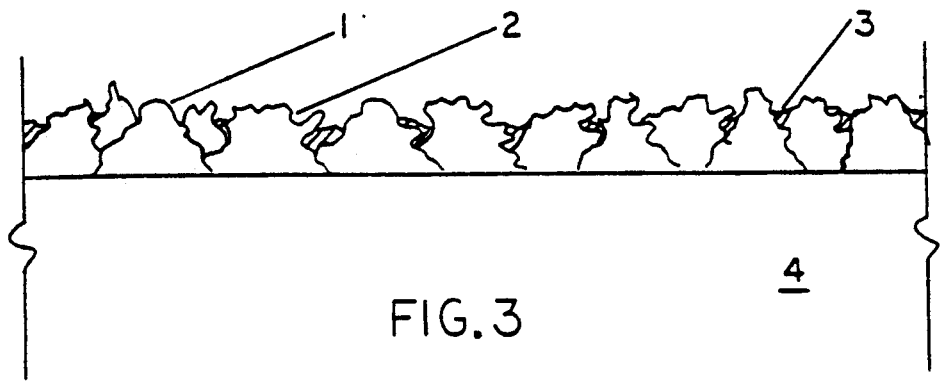
FIG. 3 is a cross-section of a second strip abrasive tool made by the process of the present invention in which the amount of abrasive particles is increased.

With respect to FIG. 3, all procedures are followed as in Example 1, with the exception of the amount of abrasive applied. A ratio of 50 percent tungsten carbide to 50 percent diamond is applied to achieve a full 100 percent density coverage. A second layer of copper-based alloy is applied to the abrasives by means of spraying to give a surface for the nickel-based alloy to adhere. The braze results give a tool with less abrasive protruding, but a much more dense coating. This gives a tool with reduced cutting speed capability, but much more durability for extended life.

EXAMPLE IV

Figure 4:
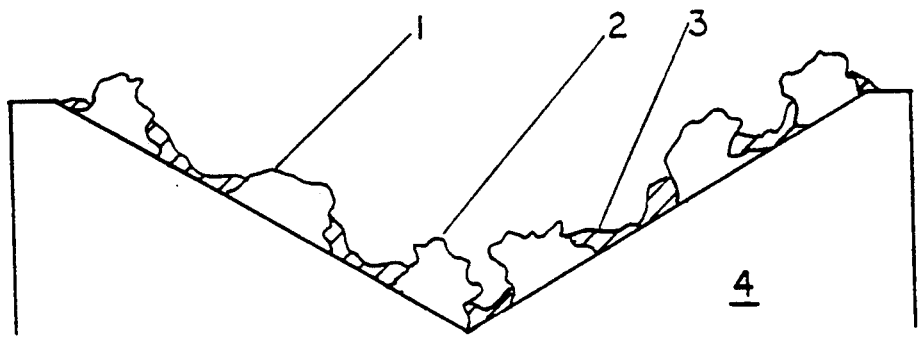
FIG. 4 is a cross-section of a V profile abrasive tool made by the process of the present invention.

With respect to FIG. 4, the procedures of Example 1 are changed to accommodate a special V profile in the face of the tool. The tool consists of a 12" diameter by 2" wide steel wheel. Copper-based alloy paste is applied as in Example 1 and the 25 percent coverage of carbide was applied to the V profile only. At this point the part is run through a braze cycle just as in Example 1. After part is cooled, a second coat of copper-based alloy past is applied to the V area. Procedures were followed as in Example 1 to apply the balance of diamond particles and nickel-based alloy. The braze cycle then is repeated to allow the copper-based alloy to remelt and alloy in with the molten nickel-based alloy. This produces the same braze alloy as in Example 1. This procedure is used when difficulty is encountered due to special part configuration.

The above description of preferred embodiments, examples and figures are for illustrative purposes only and are not intended to limit the scope and spirit of the present invention, and its equivalents, as defined by the appended claims. One skilled in the art will recognize that many variations may be made to the procedure described in this specification to result in abrasive tools different from those described herein without departing from the scope and spirit of the invention.

What is claimed is:

1. A method for brazing tungsten carbide particles and diamond particles to a substrate, comprising the steps of:
    a. applying a coating of a copper-based alloy material to the substrate;
    b. applying a coating of tungsten carbide particles and a coating of diamond particles to said copper-based alloy material;
    c. applying a coating of a nickel-based alloy material over said copper-based alloy material, said tungsten carbide particles and said diamond particles; and
    d. heating said substrate coated with said copper-based alloy material, said tungsten carbide particles, said diamond particles and said nickel-based alloy material to a temperature greater than the melting point of both said copper-based alloy material and said nickel-based alloy material.

2. The method as claimed in claim 1, wherein said copper-based alloy material comprises cuprous oxide, copper, and ethylene glycol.

3. The method as claimed in claim 2, wherein said nickel-based alloy material comprises nickel and chromium.

4. The method as claimed in claim 3, wherein said nickel-based alloy material comprises from 60 to 80 percent nickel, from 7 to 20 percent chromium, up to 8 percent boron, up to 8 percent silicon, and up to 8 percent iron.

5. The method as claimed in claim 3, wherein said heating step occurs at a temperature greater than approximately 2000° F.

6. The method as claimed in claim 5, further comprising a preheating step prior to said heating step, wherein said preheating step occurs at a temperature above at least 212° F. and below the melting point of both said copper-based alloy material and said nickel-based alloy material.

7. The method as claimed in claim 6, further comprising a cooling step after said heating step.

8. The method as claimed in claim 7, wherein said cooling step cools the heated coated substrate to a temperature of below approximately 120° F.

9. The method as claimed in claim 7, wherein said cooling step occurs in a controlled atmosphere.

10. The method as claimed in claim 9, wherein said controlled atmosphere consists essentially of a nitrogen flush.

11. The method as claimed in claim 3, wherein said copper-based alloy material is in paste form.

12. The method as claimed in claim 11, wherein said nickel-based alloy material is in powder form.

13. The method as claimed in claim 12, wherein said nickel-based alloy material has a mesh size of less than or equal to 325.

14. The method as claimed in claim 3, further comprising a step of applying over said tungsten carbide particles and said diamond particles a second coating of said copper-based alloy material.

15. The method as claimed in claim 14, wherein said coating of tungsten carbide particles covers approximately 50 percent of the surface area of said substrate and said coating of diamond particles covers approximately 50 percent of the surface area of said substrate.

16. The method as claimed in claim 3, wherein said coating of tungsten carbide particles covers up to 50 percent of the surface area of said substrate and said coating of diamond particles covers up to 50 percent of the surface area of said substrate.

17. The method as claimed in claim 3, wherein said substrate is a metal.

18. The method as claimed in claim 3, wherein said heating step occurs in a controlled atmosphere.

19. The method as claimed in claim 18, wherein said controlled atmosphere consists essentially of nitrogen and hydrogen.

20. The method as claimed in claim 2, wherein said copper-based alloy material comprises from 50 to 60 percent by weight cuprous oxide, from 20 to 30 percent copper, and from 11 to 17 percent ethylene glycol.

* * * * *